United States Patent [19]
Burkholder et al.

[11] 3,884,983
[45] May 20, 1975

[54] PROCESS FOR THE PRODUCTION OF PHOTOGRADE HYDROQUINONE

[75] Inventors: Ward J. Burkholder, Houston; Glenn E. Miller, Pasadena; Ronald C. Hays, Houston, all of Tex.

[73] Assignee: The Goodyear Tire & Rubber Company, Akron, Ohio

[22] Filed: Aug. 19, 1970

[21] Appl. No.: 65,135

[52] U.S. Cl. .......................... 260/621 A; 260/621 C
[51] Int. Cl.² .......................................... C07C 37/22
[58] Field of Search ..................... 260/621 A, 621 C

[56] References Cited
UNITED STATES PATENTS
2,789,142   4/1957   Grahm ........................... 260/621 A Primary Examiner—Leon Zitver
Assistant Examiner—Norman Morgenstern
Attorney, Agent, or Firm—Browning & Bushman

[57] ABSTRACT

Photograde hydroquinone produced by rearranging para-diisopropylbenzene dihydroperoxide is distilled to remove the rearrangement solvent and the organic by-products and impurities in the hydroquinone product are then extracted in a benzene layer which is separated from the hydroquinone containing water phase. The aqueous hydroquinone solution is concentrated in an evaporator and subjected to a charcoal treatment at a temperature of at least 70°C after which the charcoal treated solution is cooled to crystallize photograde quality hydroquinone. A reducing atmosphere is maintained in the above processing steps by adding sodium bisulfite to the processing stream at one or more points and the build-up of bisulfite and other extraneous ions is controlled by subjecting the crystallizer mother liquor to an ion exchange treatment prior to recycling to the solvent distillation column.

6 Claims, 1 Drawing Figure

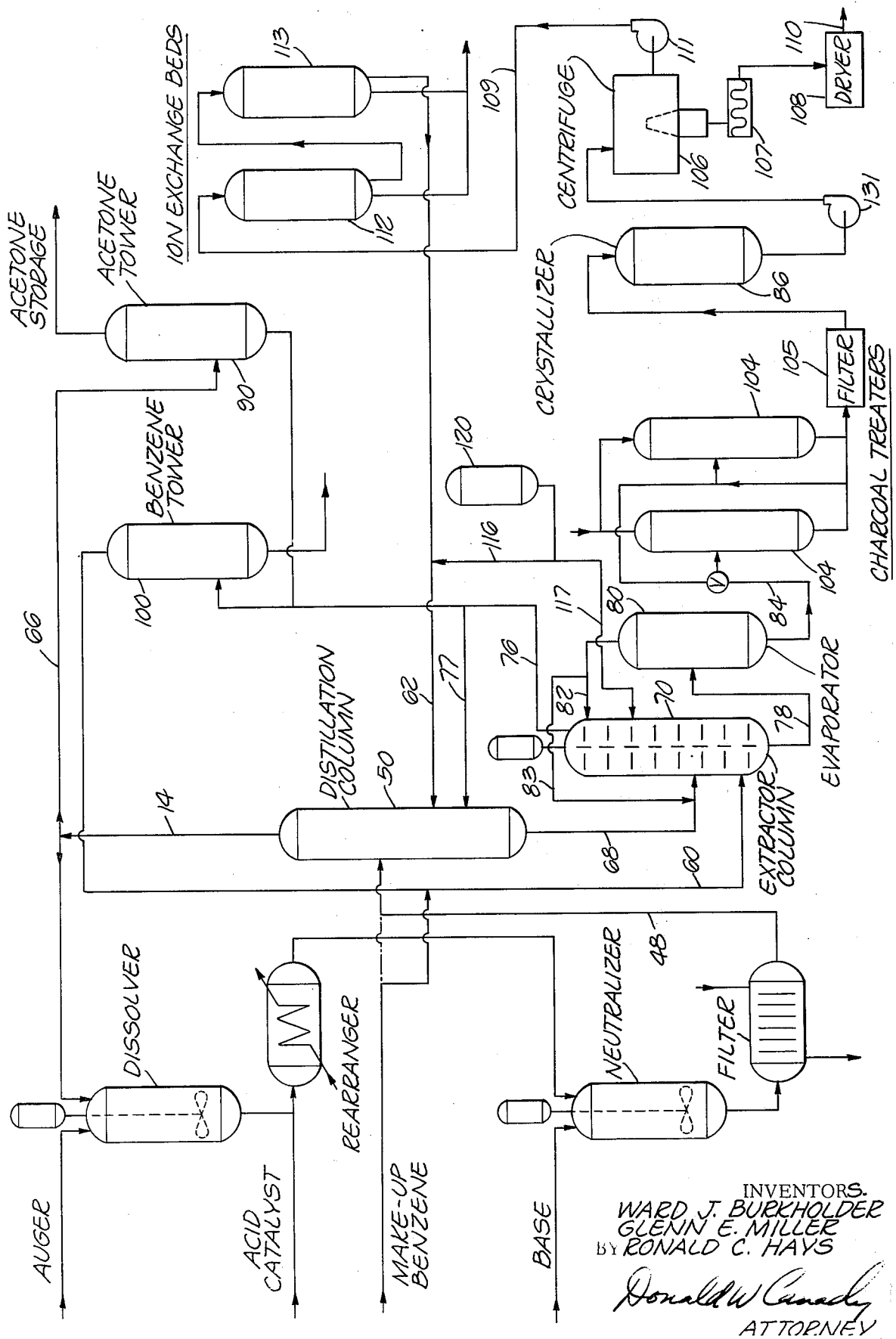

PROCESS FOR THE PRODUCTION OF PHOTOGRADE HYDROQUINONE

BACKGROUND OF THE INVENTION

When hydroquinone is manufactured by the acid catalyzed rearrangement of p-diisopropyl benzene dihydroperoxide it is convenient to recover the hydroquinone by process of neutralizing the rearranged effluent, removing the solvent material and product acetone then dissolving the product hydroquinone in water, along with some impurities. Subsequently this aqueous hydroquinone solution is back extracted with benzene to remove said impurities. The hydroquinone is conveniently recovered from the water solution by crystallization. When this process is employed, the aqueous hydroquinone solution tends to become discolored in the presence of oxidizing agents such as oxygen and hydroperoxides. Additionally, the hydroquinone produced by this method, when recovered from the aqueous solution and subsequently redissolved in water, is contaminated with water insoluble materials.

One principal use of hydroquinone is in the development of photographic film. Such use requires that the hydroquinone be of a certain minimum quality which is set out in the ASA specifications for Photographic Grade Hydroquinone. (See Table 1 herein) The prior are suggests that color bodies and other impurities may be removed from aqueous solutions of hydroquinone to produce a photograde hydroquinone by passing cool, dilute aqueous solutions of hydroquinone through activated carbon to adsorb such color bodies and impurities and subsequently recover the hydroquinone by crystallization. An alternative method of producing photograde hydroquinone is to subject the hydroquinone to successive recrystallizations from aqueous solutions.

In the prior art, removal of color bodies and impurities by carbon treatment, the aqueous hydroquinone solutions were treated in the dilute state prior to concentration. This process was followed since the concentration of the aqueous hydroquinone solution usually involved heating to drive off water and since carbon has a greater adsorbency at lower temperatures, the carbon treatment was performed prior to such concentration. Also, concentrated hydroquinone solutions of the concentrations under consideration, will crystallize at about 50°C and hence carbon treatment of a concentrated solution would have required heating in order to prevent crystallization of the hydroquinone and the concomitant lower carbon efficiency. Notwithstanding the foregoing, however, by my present process the aqueous hydroquinone solution is heated and concentrated before carbon bed treatment and the carbon treated concentrated solution then goes directly to the crystallizer where the temperature is reduced and hydroquinone crystallized and concentrated by the evaporation of water, preferably under vacuum. By following the process of our invention, photograde hydroquinone is produced from an impure aqueous solution in one crystallization step.

The efficiency of the prior art methods for producing photograde hydroquinone, was also limited as a method for the production of hydroquinone, as no provision is made for the efficient recovery of the hydroquinone which remains in the mother liquor after crystallization of the hydroquinone in a process for producing photograde hydroquinone. The method of this invention provides a means whereby near quantitative yields of photograde hydroquinone can be recovered from the aqueous solutions of hydroquinone resulting from the acid catalyzed rearrangement of diisopropylbenzene dihydroperoxide.

DISCUSSION OF THE INVENTION

An important part of my process for producing photograde hydroquinone is the maintenance of a reducing environment to prevent oxidation of hydroquinone to quinone. The reducing environment is necessary in order to overcome the effect of leaks of oxidizing substances (oxygen, dihydroperoxide, etc.) into the system. Preferably the reducing environment is maintained by adding an innocuous reducing substance such as sodium bisulfite or sodium dithionite at one or more points in the hydroquinone recovery process. As an example the bisulfite may be added to the water feed entering the distillation column where the rearranged hydroquinone product is treated to remove the acetone solvent. Sodium bisulfite may also be added to the extractor column and/or to the water reflux to the top of the extractor column. The bisulfite not only inhibits the oxidation of hydroquinone to quinone, but also converts any quinone formed, to either hydroquinone or the sulfite ester of quinone, both of which are white in color.

Since our process which is disclosed in copending application Ser. No. 16,658 filed Mar. 5, 1970 for "Process for the Continuous Isolation of Dihydric Phenols" as a continuous process, has no means for removing a waste product from the aqueous phase, it is also essential to the system to prevent build-up of extraneous ions which would encumber the system and ultimately affect product purity and recovery efficiency. Principal sources of these ions are, the sodium bisulfite or dithionite added to maintain a reducing atmosphere, oxidation decomposition products, and the ammonium sulfate which may not be completely removed by filtration following the neutralized step.

SUMMARY OF THE INVENTION

This method comprises maintaining a reducing agent, such as sodium bisulfite, sodium dithionite, zinc, or other known reducing agents, at all times in the aqueous hydroquinone solutions; evaporating substantial amounts of water (about 30–50%) from the aqueous hydroquinone solution; treating the hot (70°C) evaporated hydroquinone solution with activated charcoal; cooling the carbon treated aqueous hydroquinone solution to about room temperature to crystallize hydroquinone from said solution, recovering said hydroquinone and washing it with a 3:1 water to solid hydroquinone wash, to yield a hydroquinone product which, when dry, meets or exceeds the ASA specifications for photographic grade hydroquinone, recovering the aqueous filtrate and the wash water and subjecting these to treatment with anionic and cationic ion exchange resins to remove unwanted inorganic ions from the aqueous solutions, and recycling the ion-exchange treated aqueous solution to the crude hydroquinone recovery process to ensure full recovery of all the hydroquinone contained in the aqueous solutions.

By following the method of this invention, substantially quantitative yields of photograde hydroquinone can be recovered from the crude hydroquinone rearranger product in an economical fashion. The reducing agent helps prevent the formation of color bodies, which acts to extend the life of the carbon beds used for adsorbing any such color bodies as well as other colorless impurities. The ion exchange resins act to remove inorganic ions from the mother liquor prior to recycle to the hydroquinone recovery process, thereby allowing the complete recycle of aqueous streams containing hydroquinone.

BRIEF DESCRIPTION OF THE DRAWING

The FIGURE is a flow diagram illustrating a hydroquinone recovery process employing the present invention.

DESCRIPTION OF THE PROCESS

As taught in the commonly assigned co-pending application of Ward J. Burkholder, et al, Ser. No. 16,658, filed Mar. 5, 1970, a neutralized hydrocarbon-containing rearrangement effluent stream and an aqueous feed are introduced through line 48 into a distillation column 50 to separate the aqueous hydroquinone product from the rearrangement process solvent. Part of the acetone solvent recovered from the rearrangement product stream in the distillation column 50 is recycled through line 14 to the dissolver and part of the acetone is fed through line 66 to the acetone recovery tower 90. In addition to the product dihydric phenol, the distillation column feed (rearrangement effluent) includes three major components, namely, acetone, benzene, and water along with impurities and minor constituents not critical to the present process. With reference to the FIGURE, the rearrangement effluent is fed to distillation column 50 through line 48, and an aqueous solution is fed to column 50 from the crystallizer 86 through line 62. A benzene stream is taken from the extractor 70 and fed to the distillation column 50 through line 77.

The distillation tower bottoms are removed from column 50 through bottoms line 68. The impurity-containing benzene phase from this bottoms product, is separated from the hydroquinone-containing aqueous phase, in the extractor column 70 as taught in the aforementioned co-pending application.

Water is continuously fed from evaporation 80 to the extractor vessel 70 through line 82 near the top of the extractor column and also to the feed stream via line 83. Benzene may be fed to the extractor column near the bottom thereof, through line 60. The benzene layer formed in the extractor is withdrawn through line 76 near the top of said column with the by-products and impurities, and benzene is recovered in benzene recovery tower 100, for reuse in the extractor column 70 by recycling through line 60. Hydroquinone is recovered in the water layer formed in extractor column 70, through line 78, and fed to evaporator 80 for concentration of the hydroquinone solution from about 10–12.5% to about 17.5 to 20%, by heating to about 220°F. The excess water vapor is recovered overhead from the evaporator 80 through line 82 and recycled to the extractor column 70, partially to the product feed line 68 through line 83, and partially to the top of the extractor column 70 as the aqueous solvent for the hydroquinone. The evaporator overhead is comprised of water with about 1.5% acetone and benzene (total).

In order to maintain a reducing atmosphere during the recovery of hydroquinone, air is excluded from the system, and a sodium bisulfite solution is pumped through line 116, from tank 120 into the filtrate recycle stream entering the distillation column. Sodium bisulfite may also be fed to the extractor through line 117.

The hydroquinone-rich aqueous liquor from the evaporator 80, is fed through line 84 to carbon treating beds 104 to remove quinone and other color forming materials. The carbon treating beds 104 are conventional carbon treating beds, preferably containing conventional activated granular carbon which has improved adsorbency, effected by heating or streaming. The activated carbon may be prepared in granular form, for example, by destructive distillation of coconut shells. Minerals are removed from the granular carbon by acid-washing. These beds 104 are operated at about the temperature of the hydroquinone solution when it leaves the evaporator. Entrained carbon, if any, is removed from the carbon treated hydroquinone effluent, with filter 105, after which the carbon treated solution is fed to crystallizer 86, wherein the temperature of the hydroquinone solution is reduced to about 75°F.

The crystallized hydroquinone slurry from the crystallizer 86 is then pumped to centrifuge 106 for liquid-solids separation. The centrifuged solids may be water washed and then are discharged from the centrifuge to a screw conveyer 107 which moves the solids to dryer 108 in which the hydroquinone is heated to about 210°F at reduced pressure. Photograde crystalline hydroquinone is recovered from dryer 108 and conveyed to product handling equipment through line 110.

The centrifuge filtrate removed from the centrifuge 106, contains 7 to 8% hydroquinone and is pumped via line 109 with pump 111 to the ion exchange beds 112 and 113 and then to the distillation tower 50. According to the present process purge streams are avoided as a means for removing extraneous ions, by treating the recycle stream e.g. the centrifuge filtrate, to reduce the ion concentration thus preventing the build-up of such salts as sodium bisulfite, sodium bisulfate, ammonium sulfate, etc. Hence the centrifuge filtrate is treated with ion-exchange beds 112 and 113. The cationic bed 112 removes the cationic portion of the salt and anion bed 113 removes the salt anions. The effluent from the ion-exchange beds is then recycled to the distillation column 50 through line 62.

The following Examples are given to further illustrate our invention, however the scope of the invention is not to be limited thereto.

EXAMPLE I

An aqueous hydroquinone solution was separated by first removing acetone from a rearrangement product and separating out the organic materials in a water-benzene counter current flow extractor. Sodium bisulfite was added to the reboiler of the acetone removal tower in an average amount of about 7.5 to 15 grams per hour.

About 40 gallons of the aqueous hydroquinone solution containing about 55 hydroquinone, was placed in a Pflaudler glass lined reactor vessel and 100 grams of activated carbon (Pittsburgh Activated Carbon CPG 14 × 40) was added to the vessel. Heat was applied to the solution in the reactor vessel to bring the solution to a temperature of about 220°F to concentrate the solution to about 20% hydroquinone. The temperature of the vessel was reduced to drop the temperature of the solution to 170°F and the solution was circulated at this temperature through a loop containing a 5 micron filter for two hours. The solution was then switched to a 2 micron filter for about 1½ hours. The solution with the carbon removed, was then cooled down to effect crystallization of the hydroquinone to ambient temperature i.e. about 75°F. The water-hydroquinone slurry was centrifuged in four batches and each cake washed with a 3:1 wash water to dry cake ratio. 795 grams of hydroquinone was obtained in the first batch, which met the ASA photographic grade specifications shown in Table I. The second and third cakes of 1750 grams and 230 grams also met the photographic specification. The fourth cake which was 170 grams, was washed with a 6:1 water to cake ration but did not meet photograde specification due to yellow coloration.

TABLE I

SPECIFICATIONS AND TYPICAL ANALYSIS

| Analysis | ASA Specifications | Typical Analysis |
|---|---|---|
| Physical Appearance | | |
| Color | White | White |
| Crystalline Form | Crystalline powder or needlelike crystals | |
| Assay | | |
| Solubility | Soluble | Passes test |
| (5 grams of sample in 100 ml of dilute HOAc | (1+19) | |
| Residue after ignition | 0.05% Max | 0.007% |
| Weight of Residue | 0.0025 gm | 0.00035 gm. |
| Heavy metals as Pb | 0.001% Max. | Less than 0.001% |
| Iron | 0.001% Max. | Less than 0.001% |
| Resorcinol | 0.1% Max | Less than 0.1% |
| Melting Point, °C | 170 to 174°C. | 171°C. |

EXAMPLE II 200 grams of rearrangement reaction mixture and 50 grams of water were boiled in an open flask to strip the acetone solvent. At about 80°C overhead (flash neck), an oily material refluxed down the flask wall. This material was believed to be due to steam distillation of phenolics. Toluene was added with water to the mixture to prevent the separation of hydroquinone crystals, and the mixture was shaken in a separatory funnel. Both layers were very dark. The third and final toluene extract was fairly light. Dithionite was added but without visible effect. No charcoal or other absorbent treatment was done. The aqueous solution was reconcentrated, cooled, and the hydroquinone filtered out. A water wash dissolved some of the product but did not clear up the dark color. The sample was vacuum dried overnight at room temperature and was a medium grey color. It was found to be 98.82% hydroquinone.

EXAMPLE III 400g of $H_2O$ was heated to near boiling in a 1000 ml agitated flask, fitted with a 1 ft. column (no reflux) and a dropping funnel, to deaerate the water.

600 g. of rearranged (HQ) product solution was gradually added and the acetone-$H_2O$ stripped off. 700 ml. came overhead to 92°C, and 88 ml. between 92° and 99.7°C. The latter was cloudy with phenolics which steam distilled over. The final pH was 1.0.

There was no evidence of darkening. A dark brown viscous layer separated to the bottom. 25 g. of toluene was added and mixed. It formed a yellow layer at the top. The brown layer was still at the bottom. Shaking with 25 g. more toluene gave 3 layers, toluene on top, then the brown layer, then $H_2O$.

The $H_2O$ layer was separated and extracted twice more with 25 g. of toluene.

The the aqueous solution was passed through a 100 ml. burette packed with Pittsburgh Activated Carbon CPG 14×40. After filtration through filter aid and concentration to 182 g. a 13.0 g. crop of white crystals was removed, packed on the filter, and sucked dry (no wash). The above crystallization was to 25°C.

These vacuum dried crystals (60°C) were completely water soluble, and analyzed 99.93% hydroquinone.

EXAMPLE IV

To 1800 g. of boiled, deareated water was added 0.4–0.5 g. of $NaHSO_3$ and 305 g. of crude hydroquinone containing 200 g. of hydroquinone and 105 g. of benzene and impurities. The benzene layer was separated. The ag. layer was passed through 2 burettes packed with a total of 260 g. of Pittsburgh Activated Charcoal, Type CPG (acid washed). 68% of the water was boiled from the solution to give an approximately 26% solution. This was just fluid enough to pour when cooled to room temperature and crystallized. The hydroquinone was filtered, washed with deionized, deaerated, ice water, and dried at 60°C. under 20–24 inches vacuum. The white needlelike crystals form a water-clear 5% (wt.) aqueous solution containing no insoluble material.

The above run was repeated, and the filtrates were treated again with charcoal, concentrated, and a 2nd crop of photo-grade hydroquinone recovered.

EXAMPLE V 153.8 g of benzene-moist hydroquinone cake containing 100 g of hydroquinone, was added to 1000 g of hot, boiled water containing 0.2 g. $NaHSO_3$. The solution was separated from benzene and filtered through a "M" (medium) frit (sintered glass filter funnel) to give an orange, clear solution. This was passed through a 100 ml burette packed with 100 ml of Pittsburgh activated carbon (CPG 14×40 charcoal) which had been washed by passage of 1000 ml of water containing 1.0 g of $NaHSO_3$, with a 50 ml $H_2O$ chaser. A nitrogen atmosphere was used throughout. The solution was light yellow-green. More $NaHSO_3$ (0.2 g) was added without visible change. 5.0 g of $Na_2SO_4$ (anhyd) was added to form roughly an 0.5% $Na_2SO_4$ and 0.4% $NaHSO_3$ solution. (Sample 1) 1,108 g remained after sampling. The ph = 5.0 by test paper.

The solution was passed, dropwise, through the ion exchange resins aand emerged nearly water clear. Thus, these resins (one or both) removed color. Flow was very slow, possibly due to entrained air in the A-21 Bed. The exchange resins were both of 25 ml volume (in 25 ml burettes) and had been washed with 250 ml of water. The columns measured 36 cm×10 MM I.D. A chaser of 250 ml of boiled water was passed through the columns to pick up "free" hydroquinone. The last of it turned quite yellow, upon adding a few drops of NaOCl solution, so another 150 ml was fed through the columns. Positive hydroquinone tests were obtained, so 200 ml more $H_2O$ was fed through (total $H_2O$ wash=600 ml). A positive test was still obtained, but washing was discontinued. Weight of solution (Sample 2)=1,669 g.

This was boiled down to 400 g, to give a 20.6% solution. $NaHSO_3$ was added as needed to eliminate orange color development. (A yellow color remained.)

After cooling without mixing, the mass was filtered, covered with Saran, packed down and weighed, (65 g), washed by displacement, with 65 g of 10°C water, recovered with Saran, packed down and drawn dry. It was dried at 40°C and 18–20 vacuum, to give 45.8 g (Sample 3).

The filtrate was passed through the charcoal column again with quite noticeable color improvement to give a very light yellow hydroquinone solution again. This was concentrated and a second crop removed, (pinch of $NaHSO_3$ added to hydroquinone slurry), and washed with twice the wet cake weight of cold water. Weight of wet cake (washed)=9.0 g. Dried, as above, except loosely covered with Saran wrap. This second crop=5.5 g (Sample 4). Wet cake was 38.9% water.

tor column 70, containing 11.9% hydroquinone, 0.6% acetone, 0.1% benzene, 0.05% amonium sulfate, 0.05% sodium bisulfate and 87.3% water, is fed to evaporator 80. The temperature of the above aqueous stream from the extractor vessel 70 is approximately 120°F, and is heated in the evaporator to about 220°F. A preheater (not shown on the drawing) may be used in conjunction with the evaporator. The evaporator serves to concentrate the hydroquinone solution to about 20% hydroquinone. The concentrated solution from the evaporator is then subjected to the action of the charcoal treaters 104, at about 220°F. The carbon treated hydroquinone solution is filtered in a filter 105, precooled, and then pumped to the crystallizer vessel 86. The crystallizer is maintained at about 1 psig and the concentrated solution is cooled in the crystallizer 86, to about 77°F. A water-crystal slurry is pumped from the crystallizer 86 to a centrifuge 106 with a discharge pump 131. In the centrifuge, a solid hydroquinone cake containing 92% hydroquinone and 8% water is fed via an auger-conveyer 107 to the dryer 108. The dry photograde hydroquinone product recovered from the dryer via line 110 contains 99% hydroquinone and 0.4% water. The filtrate from the centrifuge 106 is pumped with pump 111 through line 109 to the ion exchange beds 112 and 113. This filtrate contains 7.1% hydroquinone and 92.8% water. The centrifuge filtrate charged to the ion exchange beds also contains 0.0044% sodium bisulfite, 0.02% ammonium sulfate, and 0.031% sodium bisulfate. The ion exchange treated filtrate contain 0.002% sodium bisulfite, 0.002% ammonium sulfate, and 0.002% sodium bisulfite. The hydroquinone solution treated according to the foregoing method originally contains 795 pounds per hour hydroquinone, (not including the amount of hydroquinone recycled) and 755 pounds per hour is recovered from

ANALYSES AND CALCULATIONS

Sample 1
% Hydroquinone = 7.44 × 1,108 g = 82.43 g hydroquinone
% $Na_2SO_4$ = 0.508 × 1,108 g = 5.62 $Na_2SO_4$ Sample 2
% Hydroquinone = 4.93 × 1,669 g = 82.28 hydroquinone
% $Na_2SO_4$ = 0.214 × 1,669 g = 3.572 g $Na_2SO_4$ % Recovery of hydroquinone = 100. $\frac{82.28}{82.43}$ = 99.8%

% Removal of $Na_2SO_4$ = 100. $\frac{5.629-3.572}{5.629}$ = 36.54%

Sample 3
(First Crop)
% Hydroquinone = 99.51 = passes test
Appearance - off-white needles - passes test.
Solution in diluted acetic - Soluble, light orange color - fails test.
Residue after ignition = 0.001% (max = 0.05).

Sample 4
% Hydroquinone = 99.10% passes test.
Appearance, small white needles - passes test.
Solution in diluted acetic - soluble, colorless - passes test.

EXAMPLE VI

This example is given with reference to the process depicted in the flow diagram of the drawing. The aqueous portion of a neutralized, acid catalyzed rearrangement product flowing through line 78 from the extracthe dryer as photograde hydroquinone.

Thus it can be seen from Example I, III, IV, V and VI that carbon treating produces white photograde hydroquinone. It is also indicated by Example I, IV, V and VI that bisulfite additions reduce the formation of color bodies. In Example III, bisulfite additions were not needed to maintain a reducing environment since oxidizing agents were substantially excluded from the system. Example V shows that the ion exchange resin treatment reduces the hydroquinone color. The primary benefit, however, obtained by using ion exchange resin treatment is the production of near quantitative yields of hydroquinone since excess inorganic ions can be eliminated without removing a portion of the hydroquinone containing filtrate. Example VI shows the effectiveness of carbon treating after first concentrating in hydroquinone solution.

While our invention has been described herein with reference to certain specific embodiments and examples, it is to be understood that the scope of our invention is not to be limited thereby, but rather is to be afforded the full breadth of the appended claims.

What is claimed is:

1. In a method for the recovery of crystalline photograde hydroquinone wherein a rearranged effluent obtained by the acid catalyzed rearrangement of paradiisopropylbenzene dihydroperoxide in a rearrangement solvent is neutralized and the rearrangement solvent removed and wherein there is obtained from the rearrangement solvent-free product an organic phase and a neutralized, dilute aqueous product containing said hydroquinone, the improvement comprising:

a. concentrating the dilute aqueous product by evaporating water therefrom at a temperature of from about 170° to 220°F, b. carbon treating the concentrated hydroquinone solution from step (a), c. cooling the carbon treated hydroquinone solution in a crystallizer vessel to effect crystallization of the hydroquinone from said aqueous solution, d. separating the crystallized hydroquinone from step (c), e. maintaining the aqueous product under a reducing environment throughout the hydroquinone recovery operation by excluding air from the process streams and injecting sodium bisulfite into the process stream at the commencement of the recovery process step.

2. The method of claim 1 wherein said carbon treating step is performed with activated carbon.

3. The method of claim 1 wherein the dilute aqueous product is concentrated from about 5 to 12% hydroquinone to about 20% hydroquinone.

4. The method of claim 1 wherein the carbon treated hydroquinone solution is cooled to at least about 150°F to effect crystallization of the hydroquinone.

5. The method of claim 1 wherein said carbon treated hydroquinone solution is filtered to remove carbon particles before the crystallization step.

6. The method of claim 1 wherein said cooled hydroquinone solution is pumped as a slurry to a centrifuge in which the separation of the crystallized hydroquinone from a filtrate is effected.

* * * * *

UNITED STATES PATENT AND TRADEMARK OFFICE
CERTIFICATE OF CORRECTION

PATENT NO. : 3,884,983
DATED : May 20, 1975
INVENTOR(S) : Ward J. Burkholder; Glenn E. Miller It is certified that error appears in the above—identified patent and that said Letters Patent are hereby corrected as shown below:

Column 4, line 59, delete "55" and insert therefor --5%--.

Column 5, line 38, delete "flash" and insert therefor --flask--.

Column 6, line 4, delete "The" and insert therefor --Then--.

Column 7, line 4, delete "aand" and insert therefor --and--.

Column 7, line 26, after "18-20" insert --inches--.

Column 8, line 32, delete "bisulfite" and insert therefor --bisulfate--.

Signed and Sealed this fourth Day of November 1975

[SEAL]

Attest:

RUTH C. MASON
Attesting Officer

C. MARSHALL DANN
Commissioner of Patents and Trademarks